(12) United States Patent
Aruga et al.

(10) Patent No.: US 11,813,889 B2
(45) Date of Patent: Nov. 14, 2023

(54) DECORATIVE COMPONENT AND METHOD FOR MANUFACTURING THE SAME

(71) Applicant: CITIZEN WATCH CO., LTD., Tokyo (JP)

(72) Inventors: Shosaku Aruga, Tokyo (JP); Isao Setojima, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/407,140

(22) Filed: May 8, 2019

(65) Prior Publication Data

US 2019/0344606 A1   Nov. 14, 2019

(30) Foreign Application Priority Data

May 11, 2018 (JP) .................................. 2018-092204

(51) Int. Cl.
| | | |
|---|---|---|
| *B23K 26/362* | (2014.01) | |
| *B23K 26/359* | (2014.01) | |
| *B44C 1/22* | (2006.01) | |

(52) U.S. Cl.
CPC ............ *B44C 1/228* (2013.01); *B23K 26/359* (2015.10); *B23K 26/362* (2013.01); *B32B 2605/003* (2013.01)

(58) Field of Classification Search
CPC .. B44C 1/228; B05D 3/06; B05D 5/06; B23K 26/359; B23K 26/362; B23K 26/702; B32B 2605/003; A44C 5/00; A44C 11/00

USPC ............... 427/555, 556; 219/121.65, 121.66, 219/121.68, 121.69, 121.78, 121.8
See application file for complete search history.

(56) References Cited

U.S. PATENT DOCUMENTS

| | | | | |
|---|---|---|---|---|
| 4,786,358 A | * | 11/1988 | Yamazaki | G02F 1/13439 216/48 |
| 8,729,426 B2 | * | 5/2014 | Rumsby | H05K 3/0032 219/121.68 |
| 10,099,249 B2 | * | 10/2018 | Shimada | B05D 5/02 |
| 2006/0207975 A1 | * | 9/2006 | Ehrmann | B23K 26/16 219/121.68 |
| 2006/0278613 A1 | | 12/2006 | Hess | |
| 2009/0321397 A1 | * | 12/2009 | Krishnaswami | B23K 26/0838 219/121.68 |

(Continued)

FOREIGN PATENT DOCUMENTS

| | | |
|---|---|---|
| CN | 106604784 A | 12/2014 |
| CN | 104334311 A | 2/2015 |

(Continued)

OTHER PUBLICATIONS

Nissha USA. "Hairline Finish By In Mold Technology". Retrieved from https://nisshausa.com/hairline-finish-by-in-mold-technology/ on Nov. 20, 2021 (Year: 2021).*

(Continued)

*Primary Examiner* — Jose I Hernandez-Kenney

(57) ABSTRACT

Provided is a method for manufacturing a component provided with a decoration by laser light. The method includes sequentially irradiating a target region in a surface of the component with laser light so as to draw decorative patterns in an overlaid manner, each decorative pattern being composed of a plurality of lines.

4 Claims, 13 Drawing Sheets

(56) References Cited

U.S. PATENT DOCUMENTS

| | | | |
|---|---|---|---|
| 2013/0273324 A1* | 10/2013 | Moll | C03C 23/0025 428/161 |
| 2015/0049593 A1* | 2/2015 | Oliveira | B23K 26/06 219/121.69 |
| 2016/0207141 A1 | 7/2016 | Conseil | |
| 2017/0130353 A1 | 5/2017 | Cusin et al. | |
| 2017/0136809 A1 | 5/2017 | Shimada et al. | |
| 2017/0266690 A1 | 9/2017 | Shimada et al. | |

FOREIGN PATENT DOCUMENTS

| | | | |
|---|---|---|---|
| CN | 105817766 A | | 8/2016 |
| CN | 107219747 A | | 9/2017 |
| CN | 108406119 A | | 8/2018 |
| EP | 3072627 A1 | | 9/2016 |
| JP | S58-221688 A | | 12/1983 |
| JP | 2016-117270 A | | 6/2016 |
| JP | 2017-70978 A | | 4/2017 |
| KR | 10-2009-0110956 A | | 10/2009 |
| KR | 20090110956 A | * | 10/2009 |
| WO | WO 2016/098359 A1 | * | 6/2016 |

OTHER PUBLICATIONS

Japan Patent Office, Office Action for Japanese Patent Application No. 2018-092204, dated Sep. 21, 2021 (A machine translation is attached hereto).

China National Intellectual Property Administration, First Office Action for Chinese Patent Application No. 201910384501.7, dated Jan. 17, 2022.

The State Intellectual Property Office of People's Republic of China, Office Action for Chinese Patent Application No. 1910384501. 7, dated Nov. 9, 2022.

Xing Xiaohong et al., "Mechanical Manufacturing Technology Foundation", Xidian University Press, pp. 64-65, Jul. 2018 (Cited in Chinese Office Action dated Nov. 9, 2022 for Chinese Patent Application No. 1910384501.7).

* cited by examiner

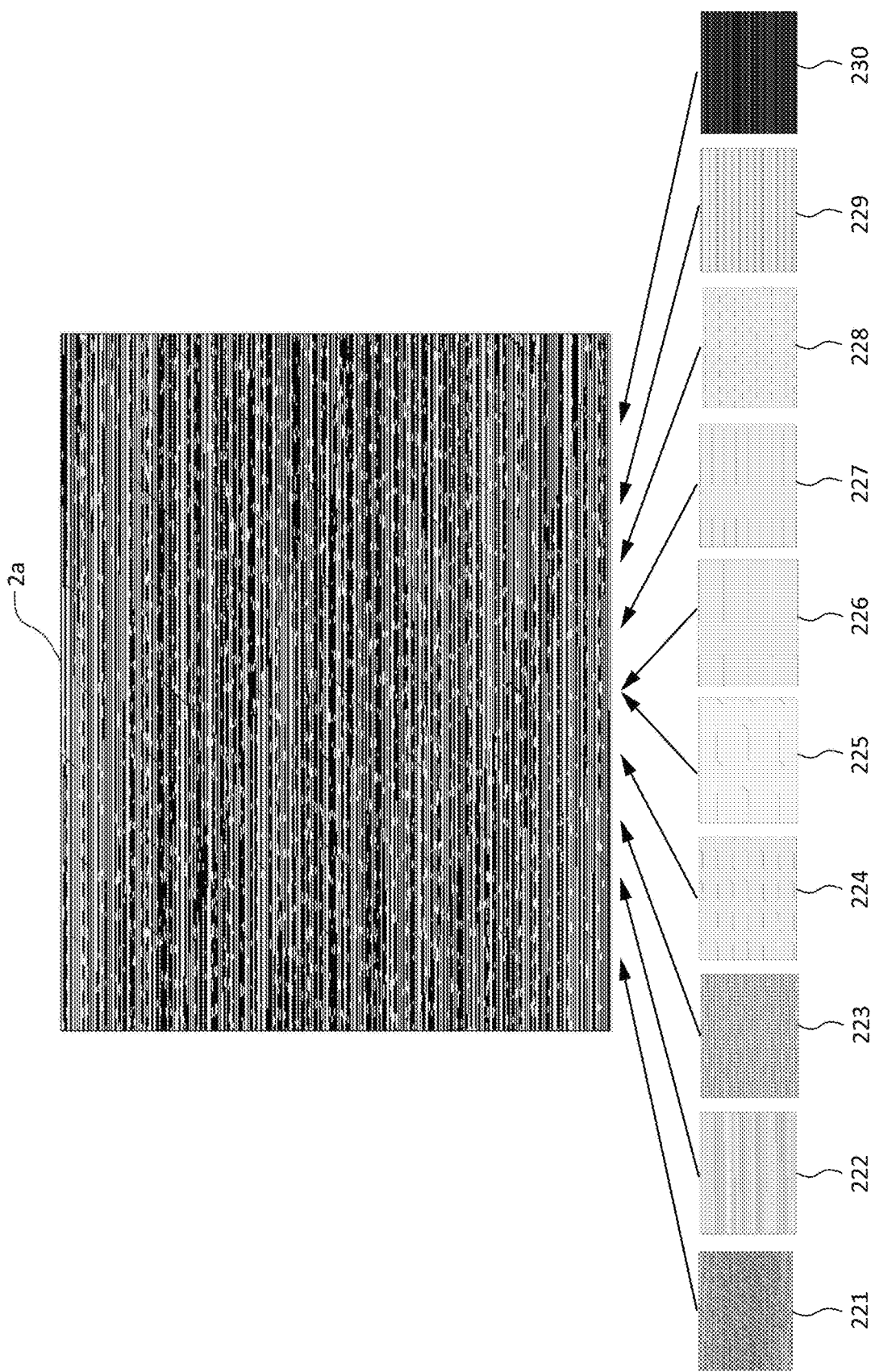

221

224

222

225

223

DECORATIVE COMPONENT AND METHOD FOR MANUFACTURING THE SAME

CROSS REFERENCE TO RELATED APPLICATION

This application claims the benefit of Japanese Patent Application JP2018-92204, filed on May 11, 2018. The disclosure of JP2018-92204 is herein incorporated by reference.

FIELD

The present invention relates to a decorative component and a method for manufacturing the same.

BACKGROUND

Various methods are known to provide decorations on components, such as inner links and outer links constituting a wristwatch band. For example, Japanese Unexamined Patent Publication No. S58-221688 (Patent Literature 1) describes that a component made of a metal, plastic or ceramic material is provided with a decoration by transferring, grinding or carving with laser light or a special-purpose tool, such as a coining tool.

A hairline pattern composed of a large number of hair-like lines drawn in a single direction is known. Such a pattern is generally formed on a component by hairline processing in which the component is scratched with a brush or other tools to form fine grooves thereon. The hairline pattern provides the decorative component with an enhanced metallic texture, causing the component to have a calm design. Performing the hairline processing on a small component, such as an inner link or outer link of a wristwatch band, involves many steps including masking portions other than the target region of the processing, cleaning after the processing, and peeling a masking member, which makes reduction of manufacturing cost less easy.

Japanese Unexamined Patent Publication No. 2016-117270 (Patent Literature 2) describes a technique to form a hairline pattern on an automobile interior component by laser light. This technique is to form arc-shaped curves having extremely large radii of curvature by laser processing, allowing for providing a fine pattern which feels like a real hairline pattern.

SUMMARY

The technique described in Patent Literature 2 allows for providing a relatively large component, such as an automobile interior component with a fine pattern which feels like a real hairline pattern. However, for a small component, such as an inner link or outer link of a wristwatch band, this technique does not create fine streaks of hairline, and thus does not realize a desired design.

It is an object of the present invention to provide a method for manufacturing a small decorative component, such as an inner link or outer link of a wristwatch band, provided with a pattern which feels like a hairline pattern.

Provided is a method for manufacturing a component provided with a decoration by laser light. The method includes sequentially irradiating a target region in a surface of the component with laser light so as to draw decorative patterns in an overlaid manner, each decorative pattern being composed of a plurality of lines.

Preferably, all of the decorative patterns are the same pattern, and the target region is irradiated with the laser light so that at least two of the decorative patterns differ from each other in directions of the lines.

Preferably, at least two of the decorative patterns are different patterns.

Preferably, directions of the lines differ in the range of ±1° between the decorative patterns.

Preferably, the directions of the lines differ in the range of ±0.1°.

Preferably, the last-drawn decorative pattern is composed of a plurality of parallel lines extending from an end to the other end of the decorative pattern.

Preferably, the lines of the last-drawn decorative pattern are spaced narrower than those of the other decorative patterns.

Preferably, the number of decorative patterns is from six to twenty inclusive.

Preferably, each of the decorative patterns is smaller in area than the target region and is drawn so as to be arrayed in a plane perpendicular to the overlaying direction of the decorative patterns, thereby covering the target region; and subregions of the target region are sequentially irradiated with the laser light so that the lines of the decorative pattern are continuous between decorative patterns adjacent in the plane.

Preferably, each of the decorative patterns is smaller in area than the target region and is drawn so as to be arrayed in a plane perpendicular to the overlaying direction of the decorative patterns, thereby covering the target region; and subregions of the target region are sequentially irradiated with the laser light so that borders between decorative patterns adjacent in the plane are displaced from each other between the overlaid decorative patterns.

Preferably, the decoration is a hairline pattern.

A component is provided including a decoration composed of a plurality of lines, each formed by laser light and having a depth which is an integer multiple of a unit depth.

Preferably, outermost lines in the decoration are continuous straight lines parallel to each other.

BRIEF DESCRIPTION OF DRAWINGS

Other features and advantages of the present invention will be apparent from the ensuing description, taken in conjunction with the accompanying drawings, in which:

FIG. 3 is a plan view of the first middle-link surface shown in FIG. 2;

FIG. 4A is a partial enlarged view of the first middle-link surface shown in FIG. 2, while

FIG. 9A is a view showing a band having middle links provided with decorations by the drawing processing of the laser processing apparatus shown in FIG. 5, while

DESCRIPTION OF EMBODIMENTS

Hereinafter, with reference to the accompanying drawings, a method for manufacturing a decorative component will be described. However, it should be noted that the present invention is not limited to the drawings or the embodiment described below. The method according to the embodiment includes drawing decorative patterns on a target region with laser light in an overlaid manner, each decorative pattern being composed of a plurality of straight lines extending in a predetermined direction. This can provide inner links and outer links of a watch band with a pattern which feels like a hairline pattern.

Although the present embodiment describes an example where the method is applied to a watch band, the present invention is not limited thereto. The component may be, for example, a case, case back, dial or movement's component of a watch (timepiece), or an ornament other than a watch.

Figure 1:
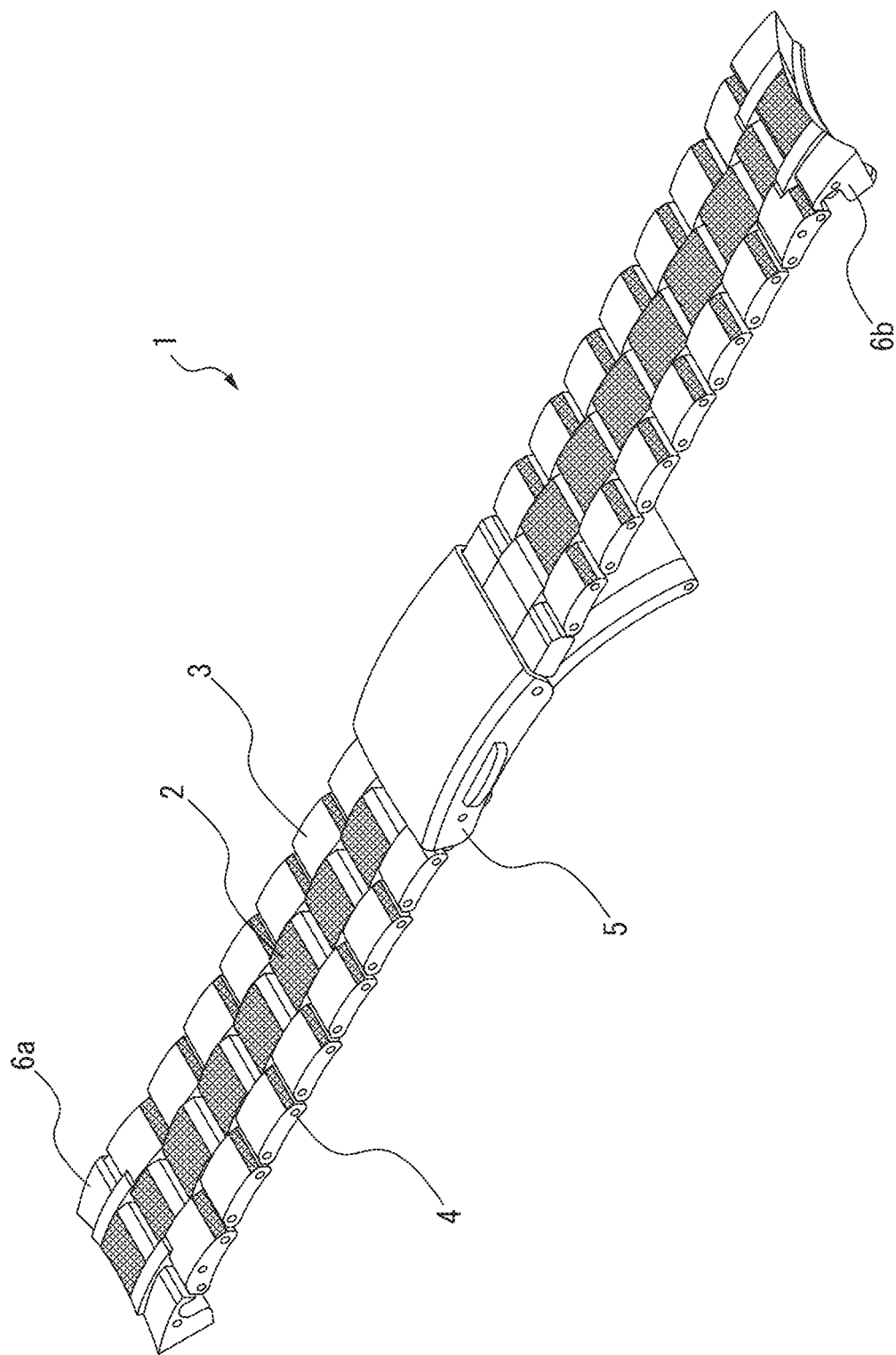
FIG. 1 is a perspective view of a band including middle links and outer links according to the embodiment.

FIG. 1 is a perspective view of a band including middle links and outer links according to the embodiment.

The band 1 includes middle links 2, outer links 3, pins 4, a clasp 5, and a pair of end pieces 6a, 6b. The middle links 2 and outer links 3 are members made of a metal, such as titanium and stainless steel, and are arrayed side by side so that the middle links 2 and outer links 3 are placed on the inner side and outer sides in the width direction of the band 1, respectively. The middle links 2 and outer links 3 may be made of a synthetic resin, such as polyurethane.

The pins 4 are respectively inserted into through holes formed in the middle links 2 and outer links 3, thereby connecting the middle links 2 and outer links 3. The clasp 5, which is also referred to as buckle, is a metal component connecting 12-o'clock-side and 6-o'clock-side portions of the band. The end pieces 6a, 6b are metal components connected to a case of a watch body.

Figure 2:
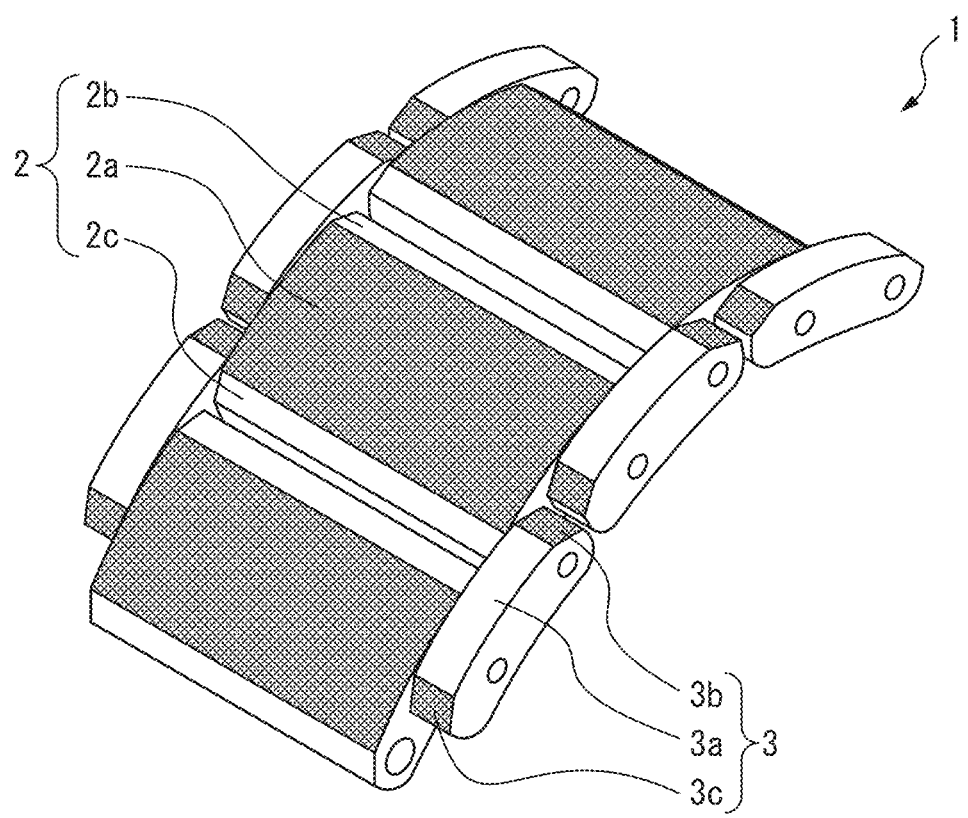
FIG. 2 is a partial enlarged perspective view of the band shown in FIG. 1.

FIG. 2 is a partial enlarged perspective view of the band 1.

The middle links 2 each include a first middle-link surface 2a, a second middle-link surface 2b, and a third middle-link surface 2c. The first middle-link surface 2a is a surface on the front side of the band 1 and is substantially parallel to the longitudinal direction of the band 1. The first middle-link surface 2a is a decorated region in which decorative patterns, each composed of a plurality of straight lines, are drawn in an overlaid manner with laser light. The second and third middle-link surfaces 2b, 2c are mirror-finished surfaces respectively extending from one side and the other side of the first middle-link surface 2a perpendicular to the longitudinal direction of the band 1 slantly with respect to the first middle-link surface 2a.

Figure 4A:
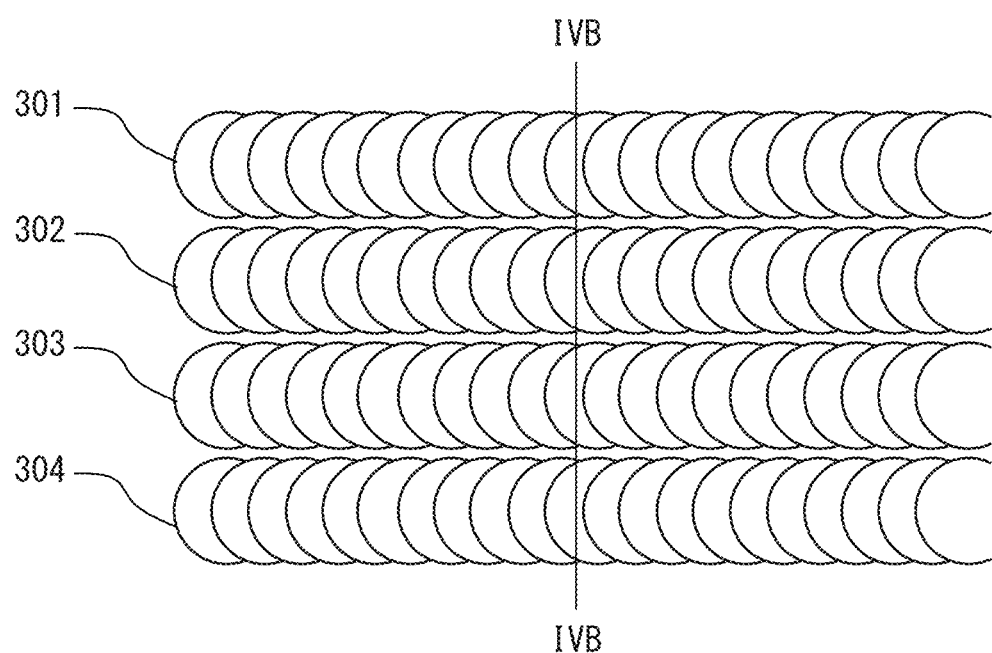
Figure 4B:
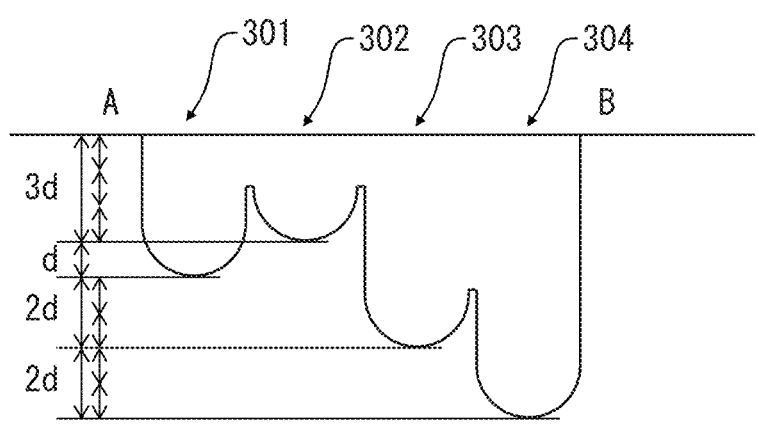
FIG. 4B is a diagram showing a cross section taken along line IVB-IVB shown in FIG. 4A.

FIG. 3 is a plan view of the first middle-link surface 2a. FIG. 4A is a partial enlarged view of the first middle-link surface 2a, while FIG. 4B is a diagram showing a cross section taken along line IVB-IVB shown in FIG. 4A.

As shown in FIG. 3, the first middle-link surface 2a has decorative patterns, e.g., first to tenth decorative patterns 221-230, drawn in an overlaid manner, each composed of parallel lines. For example, the lines constituting the first to tenth decorative patterns 221-230 are substantially parallel to each other in each decorative pattern. The directions of the lines constituting the first to tenth decorative patterns 221-230 preferably differ in the range of ±1°, and more preferably in the range of ±0.1°. Even if the decorative patterns are overlaid so that the lines are parallel (i.e., the angular difference is 0°), a pattern which feels like a hairline pattern can be realized. However, displacing the lines in the above range between the decorative patterns allows for realizing a pattern more similar to the hairline pattern.

All of the decorative patterns may be the same pattern. In this case, at least two decorative patterns are drawn so as to differ from each other in directions of the lines. In this case, the decorative patterns are preferably drawn so that they are displaced from each other to cover the target region with lines. This allows for realizing a pattern which feels like a hairline pattern.

As shown in FIG. 4A, the first middle-link surface 2a includes first to fourth lines 301-304 substantially parallel to each other. These lines are each formed by irradiating the first middle-link surface 2a with laser light having a circular spot while gradually shifting it in one direction. Then, the first to fourth lines 301-304 each have a shape such that scalelike recesses are continuously arrayed as viewed from above.

The first to fourth lines 301-304 are each formed by overlaying straight lines constituting the decorative patterns. Specifically, the first to fourth lines 301-304 are formed by overlaying straight lines of four, three, six and eight decorative patterns, respectively.

As shown in FIG. 4B, the depths of the first to fourth lines 301-304 are 4d (=3d+d), 3d, 6d (=3d+d+2d) and 8d (=3d+d+2d+2d), which are four times, three times, six times and eight times the amount d carved by one laser irradiation, respectively. In other words, the depths of the first to fourth lines 301-304 are integer multiples of a unit depth, which is the amount d carved by one laser irradiation. For example, when the thickness of the middle links 2 is about 3 mm, the maximum amount carved by laser irradiation is about 10 μm. The carved depth can be increased by repeating laser irradiation.

The outer links 3 each include a first outer-link surface 3a, a second outer-link surface 3b, and a third outer-link surface 3c. The first outer-link surface 3a is a mirror-finished surface on the front side of the band 1 and is substantially parallel to the longitudinal direction of the band 1. The second and third outer-link surfaces 3b, 3c are surfaces respectively extending from one side and the other side of the first outer-link surface 3a perpendicular to the longitudinal direction of the band 1 slantly with respect to the first outer-link surface 3a. The second and third outer-link surfaces 3b, 3c are decorated regions in which decorative patterns, each composed of parallel straight lines, are drawn in an overlaid manner.

The second and third outer-link surfaces 3b, 3c have decorative patterns drawn by irradiating these surfaces with laser light having a circular spot while gradually shifting it in one direction, similarly to the first middle-link surface 2a.

Figure 5:
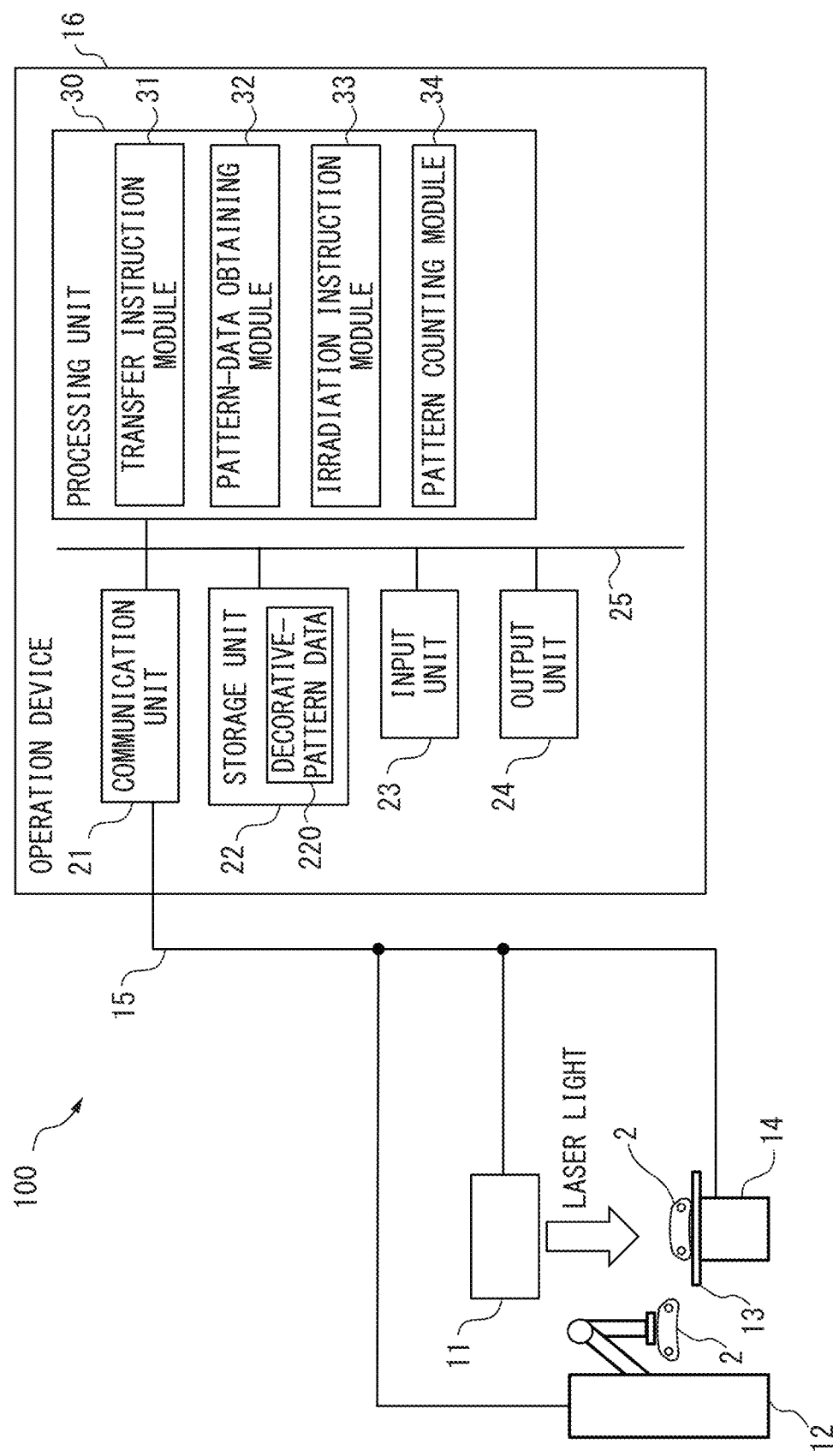
FIG. 5 is a diagram showing a laser processing apparatus for drawing decorations on the first middle-link surface, and the second and third outer-link surfaces shown in FIG. 2.

FIG. 5 is a diagram showing a laser processing apparatus for drawing decorations on the first middle-link surface 2a, and the second and third outer-link surfaces 3b, 3c.

The laser processing apparatus 100 includes a laser source 11, a component transferring device 12, a processing table 13, a processing-table driver 14, a LAN 15, and an operation device 16.

The laser source 11 includes a laser generator, an optical path, such as an optical fiber, transmitting laser light emitted from the laser generator, and a condenser condensing the laser light transmitted through the optical path to output it toward a target region, such as the first middle-link surface 2a. The laser generator in the laser source 11 is a solid-state generator, such as YAG laser, or a gas-state generator, such as $CO_2$ laser.

The component transferring device 12 includes an arm capable of holding a component, such as a middle link 2 or outer link 3, and transfers the component in accordance with instructions from the operation device. An exemplary embodiment will be described below by taking a middle link 2 as an example of the component to be decorated. The component transferring device 12 places a middle link 2 whose first middle-link surface 2a is to be decorated, on the processing table 13 for irradiation, and transfers the middle link 2 whose first middle-link surface 2a has been decorated, from the processing table 13 to a storage space (not shown). The component may be supplied by hand or an external device to omit the component transferring device 12.

The processing table 13 is a flat-shaped member made of a metal, for example. The processing-table driver 14 supports the processing table 13 so as to be movable in the horizontal direction. The processing-table driver 14 moves the processing table 13 in accordance with instructions from the operation device 16, so that the decorative patterns are drawn on the first middle-link surface 2a of the middle link 2. Although the processing table 13 moves during processing in the present embodiment, the laser source 11 may move during processing.

The LAN 15 is a signal transmission line, such as a coaxial cable, connecting the operation device 16 to the laser source 11, component transferring device 12 and processing-table driver 14. The LAN 15 transmits a command outputted from the operation device 16 to the laser source 11, component transferring device 12 and processing-table driver 14.

The operation device 16 includes a communication unit 21, a storage unit 22, an input unit 23, an output unit 24, and a processing unit 30, which are connected to each other through a bus 25.

The communication unit 21 includes an interface circuit for wired communication, such as Ethernet (registered trademark), and communicates through the LAN 15 with the laser source 11, component transferring device 12 and processing-table driver 14 as well as a host controller (not shown).

The storage unit 22 includes at least one of a semiconductor memory, a magnetic tape device, a magnetic disk device and an optical disk device, for example, and stores an operating system program, driver programs, application programs, and data which are used for processing in the processing unit 30. For example, the storage unit 22 stores an application program, such as a drawing program for executing drawing processing to draw a desired decoration with laser light on a target region of a component, such as a middle link 2 or outer link 3. The drawing program may be installed on the storage unit 22 from a computer-readable portable recording medium, such as a CD-ROM or DVD-ROM, by using a known set-up program, or may be stored directly in the storage unit 22 from the outside of the operation device 16 through the LAN or other transmission lines.

The storage unit 22 also stores various kinds of data used in the drawing processing. For example, the storage unit 22 stores decorative-pattern data indicating decorative patterns which are drawn by irradiating a target region of a component, such as a middle link 2 or outer link 3, with laser light. The storage unit 22 may further store temporary data associated with predetermined processing.

FIGS. 6A to 6E and 7F to 7J are partial enlarged views of the decorative patterns shown in FIG. 3. These patterns correspond to the decorative-pattern data stored in the storage unit 22. FIGS. 6A to 6E and 7F to 7J show the first to tenth decorative patterns 221-230, respectively.

In the present embodiment, the first to tenth decorative patterns 221-230 are each composed of parallel straight lines. For example, each of the first to tenth decorative patterns 221-230 is a square pattern measuring 20 mm square.

Figure 6A:
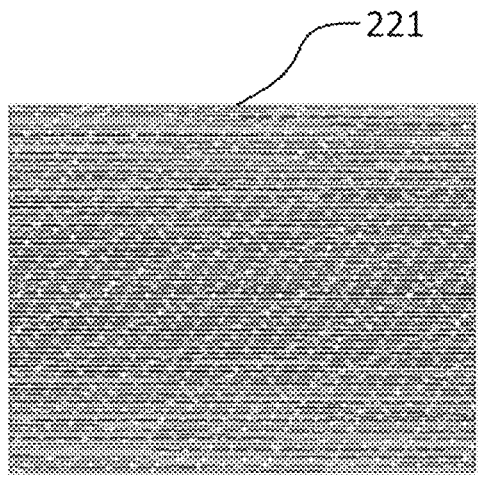
FIGS. 6A to 6E and 7F to 7J are partial enlarged views of the decorative patterns corresponding to the decorative-pattern data stored in the storage unit shown in FIG. 5.

The first decorative pattern 221 shown in FIG. 6A is composed of lines extending from one end to the other end thereof and lines broken between both ends. These lines are non-uniformly spaced in the direction perpendicular to the lines.

Figure 6D:
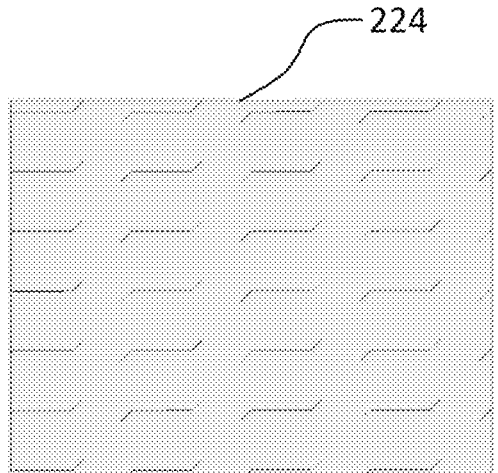
Figure 6B:
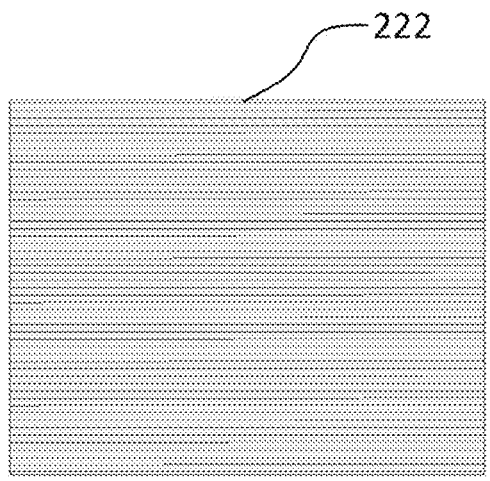

The second decorative pattern 222 shown in FIG. 6B is composed of lines which are broken between both ends thereof and displaced from each other in the direction of the lines. These lines are uniformly spaced in the direction perpendicular to the lines.

Figure 6E:
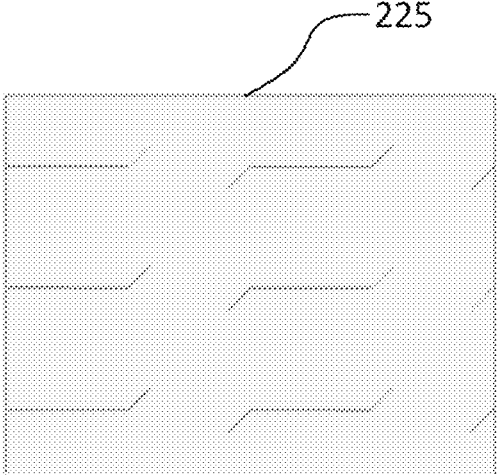
Figure 6C:
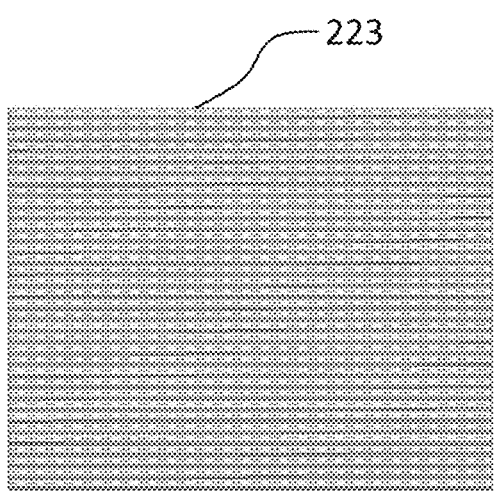

The third decorative pattern 223 shown in FIG. 6C is composed of broken lines and units of three solid lines extending from one end to the other end thereof. The broken lines and units of solid lines are spaced at regular intervals.

The fourth decorative pattern 224 shown in FIG. 6D is composed of arrayed unit patterns, each having a hook shape. Each unit pattern is composed of a first line extending in the horizontal direction, a second line extending at 45° to the first line from one end thereof, and a third line extending at −45° to the first line from the other end thereof. The direction of the lines of the fourth decorative pattern 224 refers to that of the first line.

The fifth decorative pattern 225 shown in FIG. 6E is composed of arrayed unit patterns, each having a hook shape larger than the unit pattern of the fourth decorative pattern 224. As in the fourth decorative pattern 224, each unit pattern is composed of a first line extending in the horizontal direction, and second and third lines extending at ±45° to the first line from the respective ends thereof. The direction of the lines of the fifth decorative pattern 225 refers to that of the first line.

Figure 7F:
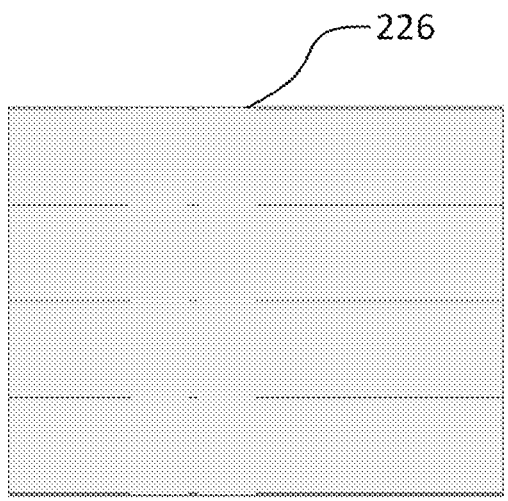

The sixth decorative pattern 226 shown in FIG. 7F is composed of units of lines equally spaced in the direction perpendicular to these lines. Each unit of lines includes a first line, a second line shorter than the first line, and a third line longer than the first line; these are arrayed in line. The first and third lines are disposed at a first distance from the second line.

Figure 7I:
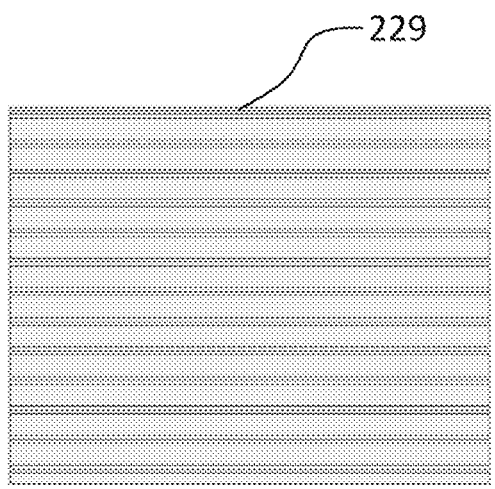
Figure 7G:
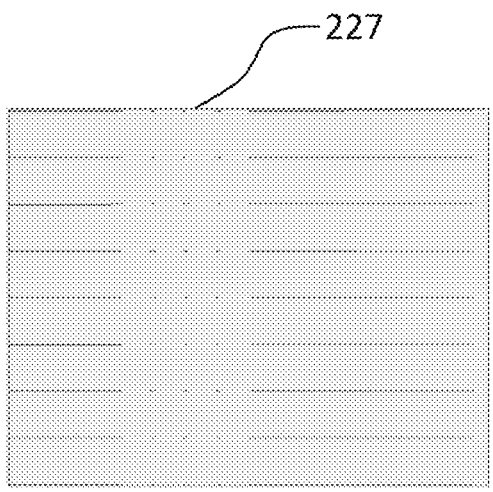

The seventh decorative pattern 227 shown in FIG. 7G is composed of units of lines equally spaced in the direction perpendicular to these lines. Each unit of lines includes a first line, second lines shorter than the first line, and a third line longer than the first line; these are arrayed in line. The first and third lines are disposed at a first distance from the leftmost and rightmost second lines, respectively.

Figure 7J:
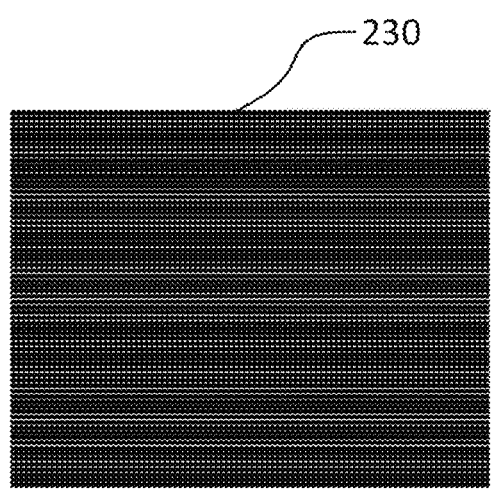
Figure 7H:
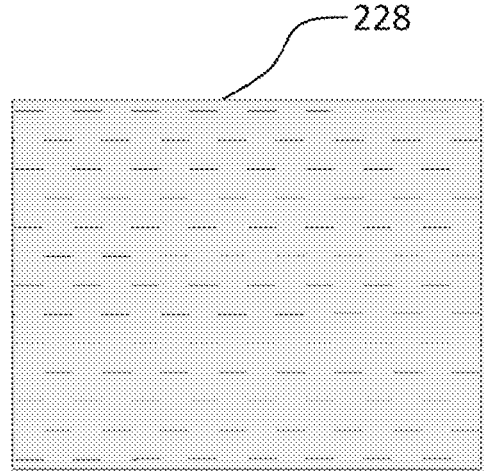

The eighth decorative pattern 228 shown in FIG. 7H is composed of first sets and second sets of lines alternately disposed in the direction perpendicular to these lines at regular intervals. Each of the first and second sets includes line segments having the same length and arrayed in line at regular intervals. One ends of the leftmost line segments in the first sets touch the left end of the eighth decorative pattern 228, while one ends of the rightmost line segments in the second sets touch the right end of the eighth decorative pattern 228.

The ninth decorative pattern 229 shown in FIG. 7I is composed of sets of lines equally spaced in the direction perpendicular to these lines. Each set includes three lines extending from one end to the other end of the ninth decorative pattern 229. The distances in the perpendicular direction between the three lines differ between the sets of lines.

The tenth decorative pattern 230 shown in FIG. 7J is composed of lines extending from one end to the other end thereof and disposed narrower in the direction perpendicular to these lines than those of the first to ninth decorative patterns 221-229. Drawing the tenth decorative pattern 230 lastly makes the outermost lines be continuous and parallel to each other.

In this way, drawing continuous lines extending from one end to the other end of the decorative pattern at small intervals in the direction perpendicular to these lines by laser irradiation produces a real hairline pattern which compares favorably in texture with brushing processing. The lines of the last-drawn tenth decorative pattern 230 may not be necessarily disposed narrower in the direction perpendicular to these lines than those of the first to ninth decorative patterns 221-229. Even in this case, a pattern which feels like a hairline pattern can be realized.

With reference to FIG. 5 again, the input unit 23 may be, for example, a touch pad, a keyboard, or any other device which can input data. An operator can input letters, numerals and symbols with the input unit 23. When operated by the operator, the input unit 23 generates a signal corresponding to the operation, which signal is supplied as instructions by the operator to the processing unit 30.

The output unit 24 may be, for example, a liquid crystal display, an organic electroluminescent (EL) display, or any other device which can display video and images. The output unit 24 displays video or images corresponding to video or image data supplied from the processing unit 30. The output unit 24 may be an output device for displaying video or printing images or letters on a displaying medium, such as paper.

The processing unit 30 includes one or more processors and their peripheral circuits. The processing unit 30, which is a CPU, for example, centrally controls the entire operation of the operation device 16, and executes processing based on the programs (e.g., driver programs, operating system program and application programs) stored in the storage unit 22. The processing unit 30 can execute multiple programs (e.g., application programs) in parallel.

The processing unit 30 includes a transfer instruction module 31, a pattern-data obtaining module 32, an irradiation instruction module 33, and a pattern counting module 34. These are functional modules implemented by a program executed on the processor included in the processing unit 30. Alternatively, these modules may be implemented as firmware in the operation device 16.

Figure 8:
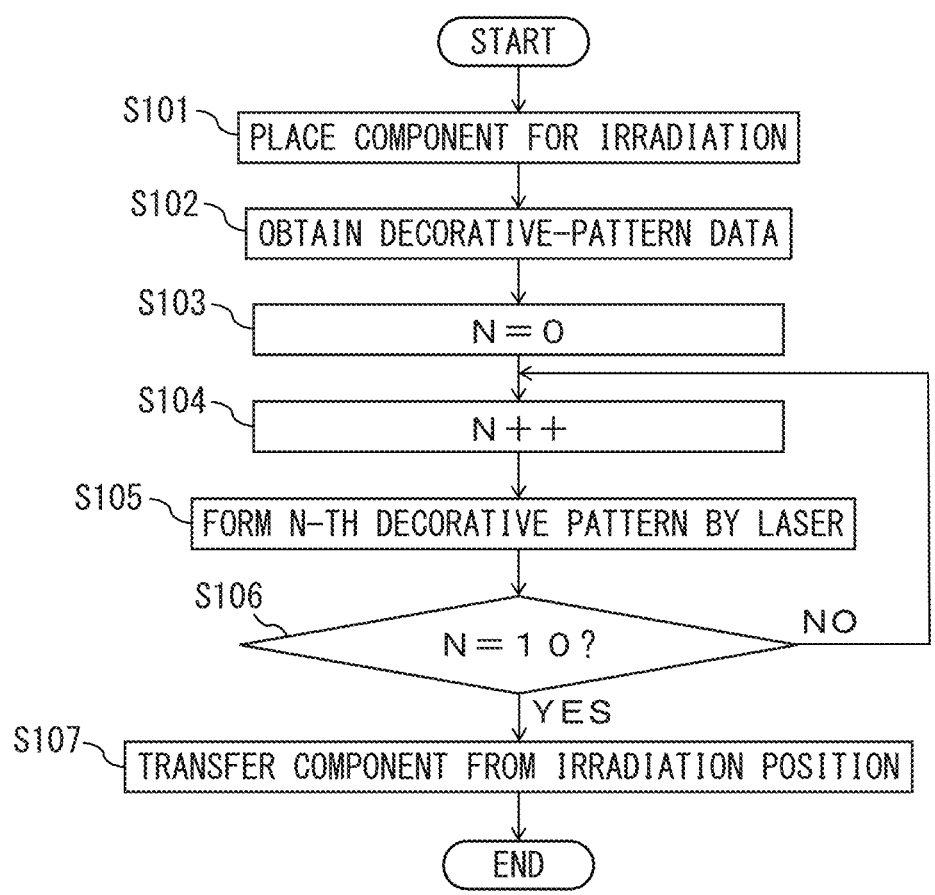
FIG. 8 is a flowchart of the drawing processing performed by the laser processing apparatus shown in FIG. 5.

FIG. 8 is a flowchart of the drawing processing performed by the laser processing apparatus 100. The drawing processing shown in FIG. 8 is executed primarily by the processing unit 30 collaborating with the units constituting the operation device 16, based on the programs prestored in the storage unit 22. This drawing processing is executed as a process in a method for manufacturing a component, such as a middle link 2 or outer link 3.

First, the transfer instruction module 31 outputs to the component transferring device 12 a command to place a component at a predetermined position for irradiation, the component having a target region to be decorated in a surface thereof (S101). In response to the input of this command, the component transferring device 12 places a middle link 2 at the position on the processing table 13.

The pattern-data obtaining module 32 then obtains decorative-pattern data indicating the first to tenth decorative patterns 221-230 from the storage unit 22 (S102).

The pattern counting module 34 then sets a parameter "N" at "0" (S103), and increments it to "1" (S104).

The irradiation instruction module 33 then outputs to the laser source 11 and processing-table driver 14 a command to draw the first decorative pattern on the target region of the first middle-link surface 2a with laser light (S105). In response to the input of this command, the laser source 11 outputs laser light of predetermined power toward the target region, while the processing-table driver 14 moves the processing table 13 so that the first decorative pattern 221 is drawn. Although the processing table 13 is moved for processing in the present embodiment, the laser source 11 may be moved instead.

The pattern counting module 34 then determines whether the parameter "N" is "10" (S106). Since the parameter "N" is now "1", the pattern counting module 34 determines that the parameter "N" is not "10" (No in S106), and the process returns to S104. Until the parameter "N" equals "10" (YES in S106), steps S104 to S106 are repeated. While steps S104 to S106 are repeated, the target region of the first middle-link surface 2a is sequentially irradiated with laser light so as to draw the first to tenth decorative patterns 221-230 in an overlaid manner.

When the parameter "N" equals "10" (YES in S106), the transfer instruction module 31 outputs to the component transferring device 12 a command to transfer the component provided with a decoration on the target region, from the position for irradiation (S107). In response to the input of this command, the component transferring device 12 transfers the middle link 2 from the processing table 13 to a storage space (not shown).

In the drawing processing performed by the laser processing apparatus 100, decorative patterns are drawn on the target region in an overlaid manner by laser light, allowing for providing a small component, such as an inner link or outer link of a wristwatch band, with a pattern which feels like a hairline pattern.

Figure 9A:
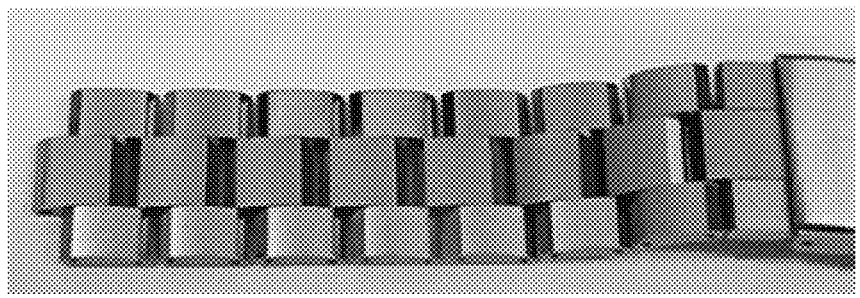
Figure 9B:
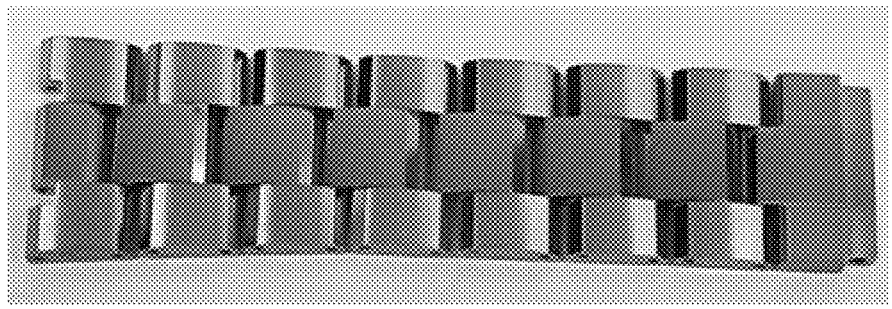
FIG. 9B is a view showing a band having middle links provided with a hairline pattern by hairline processing with a brush.

FIG. 9A is a view showing a band having middle links provided with decorations by the drawing processing of the laser processing apparatus 100, while FIG. 9B is a view showing a band having middle links provided with a hairline pattern by hairline processing with a brush.

As shown in FIGS. 9A and 9B, the drawing processing of the laser processing apparatus 100 can provide the middle links with a pattern feels like a hairline pattern formed with a brush.

In the drawing processing performed by the laser processing apparatus 100, since the decorations are formed by laser light, the steps of masking, cleaning, and peeling a masking member, which are performed in the hairline processing with a brush or other tools, can be omitted. This allows for reducing the manufacturing cost as compared to the hairline processing with a brush or other tools.

The laser processing apparatus 100 lastly draws the tenth decorative pattern 230 having lines spaced at the narrowest intervals, which improves uniformity of the decoration formed in each target region, resulting in a pattern which really feels like a hairline pattern.

The laser processing apparatus 100 draws the first to tenth decorative patterns 221-230 so that the directions of the lines differ in the range of ±1° between the decorative patterns, resulting in a pattern which really feels like a hairline pattern.

The laser source 11 of the laser processing apparatus 100 outputs laser light of predetermined power when drawing the decorative patterns, which prevents the possibility that the power of the laser light becomes unstable in response to fluctuations of its output.

Figure 10:
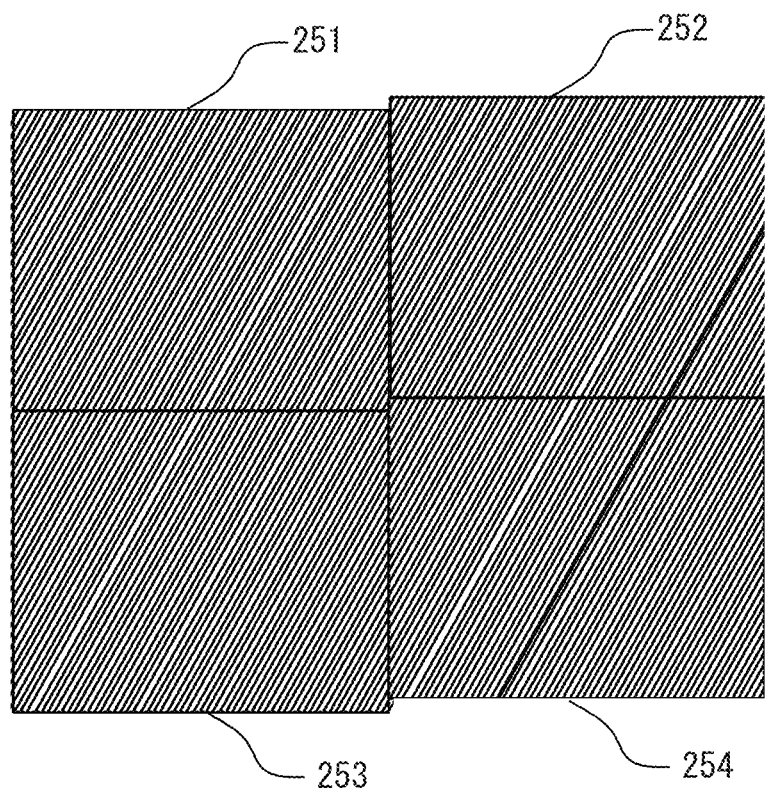
FIG. 10 is a diagram for explaining drawing processing according to a first modified example.

FIG. 10 is a diagram for explaining drawing processing according to a first modified example.

The first modified example is an example where the target region on which the drawing processing is performed is larger in area than each decorative pattern, i.e., the region which can be irradiated with laser light. In the example shown in FIG. 10, the area of the target region is four times as large as that of each decorative pattern.

In the drawing processing according to the first modified example, the same decorative patterns are formed repeatedly in the horizontal and vertical directions so that their lines are continuous between adjacent decorative patterns.

In FIG. 10, the lines of a decorative pattern drawn at a first position 251 connect with those of decorative patterns drawn at second and third positions 252, 253. The lines of a decorative pattern drawn at the second position 252 connect with those of decorative patterns drawn at the first and a fourth positions 251, 254. The lines of a decorative pattern drawn at the third position 253 connect with those of decorative patterns drawn at the first and fourth positions 251, 254. The lines of a decorative pattern drawn at the fourth position 254 connect with those of decorative patterns drawn at the second and third positions 252, 253.

Figure 11:
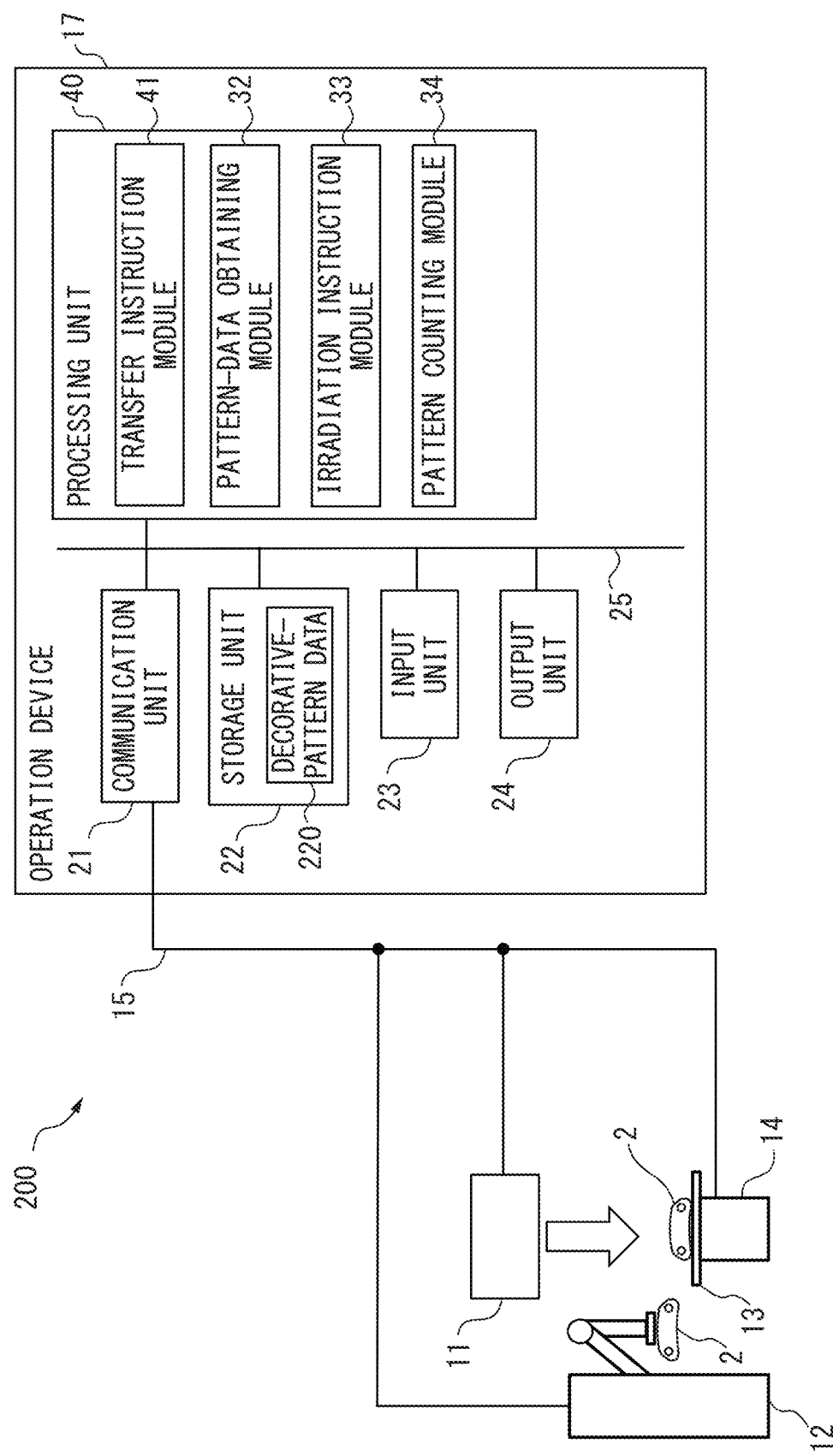
FIG. 11 is a diagram showing a laser processing apparatus performing the drawing processing according to the first modified example.

FIG. 11 is a diagram showing a laser processing apparatus performing the drawing processing according to the first modified example.

The laser processing apparatus 200 differs from the laser processing apparatus 100 in that the former includes an operation device 17 instead of the operation device 16. The operation device 17 differs from the operation device 16 in that the former includes a processing unit 40 including a transfer instruction module 41 instead of the processing unit 30 including the transfer instruction module 31. Since the constituents and functions of the laser processing apparatus 200 other than the transfer instruction module 41 are the same as those of the laser processing apparatus 100 assigned the same reference numerals, duplicated explanation is omitted.

Figure 12:
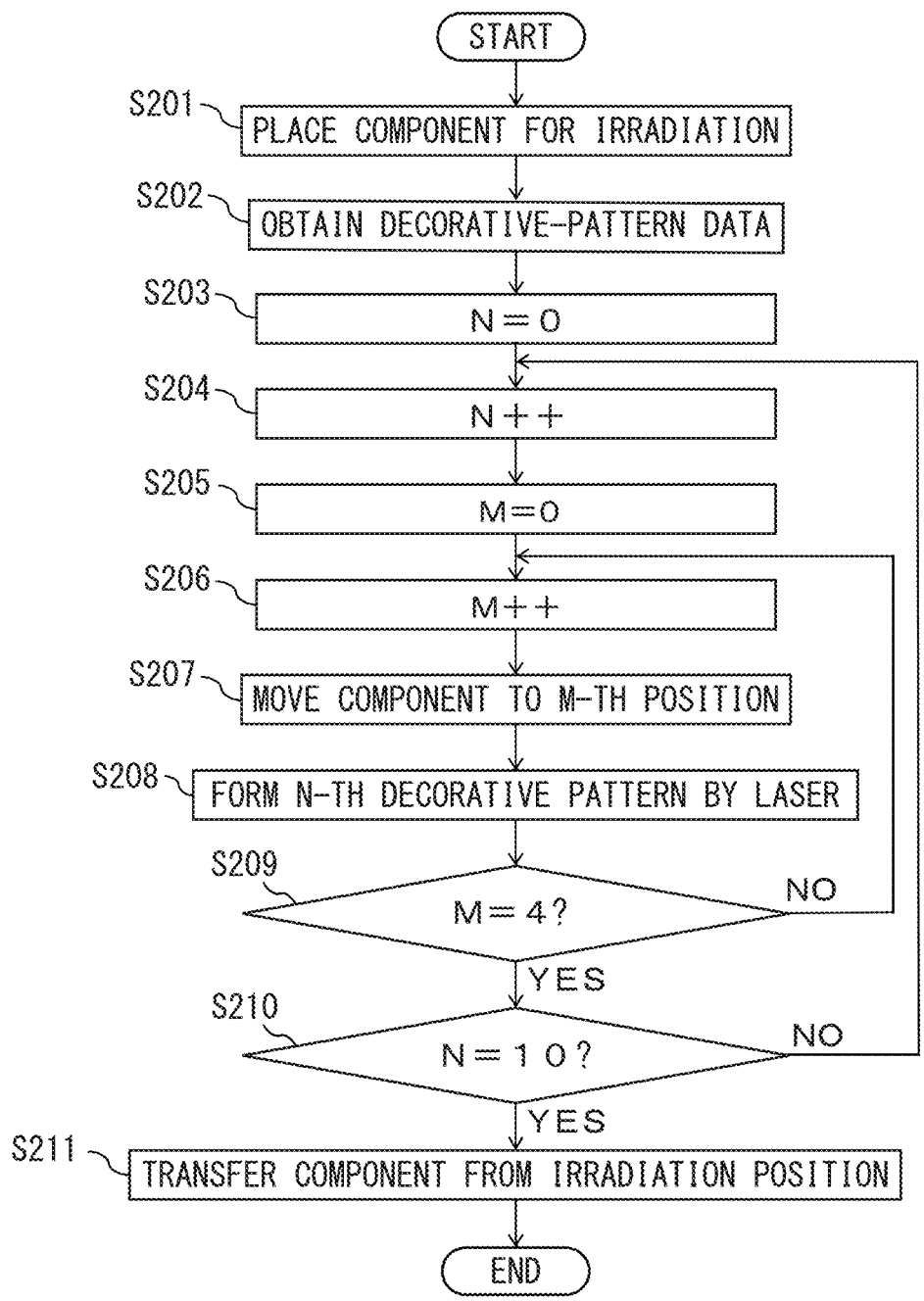
FIG. 12 is a flowchart of the drawing processing performed by the laser processing apparatus shown in FIG. 11.

FIG. 12 is a flowchart of the drawing processing performed by the laser processing apparatus 200. The drawing processing shown in FIG. 12 is executed primarily by the processing unit 40 collaborating with the units constituting the operation device 17, based on the programs prestored in the storage unit 22. This drawing processing is executed as a process in a method for manufacturing a component, such as a middle link 2 or outer link 3.

Since steps S201 to S204 are the same as steps S101 to S104, duplicated explanation is omitted. The transfer instruction module 41 sets a parameter "M" at "0" (S205), and increments it to "1" (S206). The transfer instruction module 41 then outputs to the processing-table driver 14 a command to move a middle link 2 to the first position (S207). In response to the input of this command, the processing-table driver 14 moves the middle link 2 to the first position for drawing on the upper left of the target region. The irradiation instruction module 33 then outputs to the laser source 11 and processing-table driver 14 a command to draw the first decorative pattern on the target region of the first middle-link surface 2a with laser light (S208). Although the processing table 13 is moved for processing in the present embodiment, the laser source 11 may be moved instead.

The transfer instruction module 41 then determines whether the parameter "M" is "4" (S209). Since the parameter "M" is now "1", the transfer instruction module 41 determines that the parameter "M" is not "4" (No in S209), and the process returns to S206. Until the parameter "M" equals "4" (YES in S209), steps S206 to S209 are repeated.

The second position is for drawing on the upper right of the target region and is such that the lines of a decorative pattern drawn at the second position connect with those of decorative patterns drawn at the first and fourth positions. The third position is for drawing on the lower left of the target region and is such that the lines of a decorative pattern drawn at the third position connect with those of decorative patterns drawn at the first and fourth positions. The fourth position is for drawing on the lower right of the target region and is such that the lines of a decorative pattern drawn at the fourth position connect with those of decorative patterns drawn at the second and third positions.

While repeating steps S206 to S209, the laser processing apparatus 200 can sequentially irradiate subregions of the target region with laser light so that the lines of the first decorative pattern 221 are continuous between adjacent decorative patterns (subregions). The laser processing apparatus 200 can draw a decoration having an area four times as large as the first decorative pattern 221, on the target region of the first middle-link surface 2a. Since steps S210 and S211 are the same as steps S106 and S107, duplicated explanation is omitted.

In the drawing processing according to the first modified example, the decorative patterns are formed so that the lines constituting each decorative pattern are continuous between adjacent decorative patterns, which provides the target region having an area larger than each decorative pattern with a decoration without borders of the decorative patterns.

Figure 13:
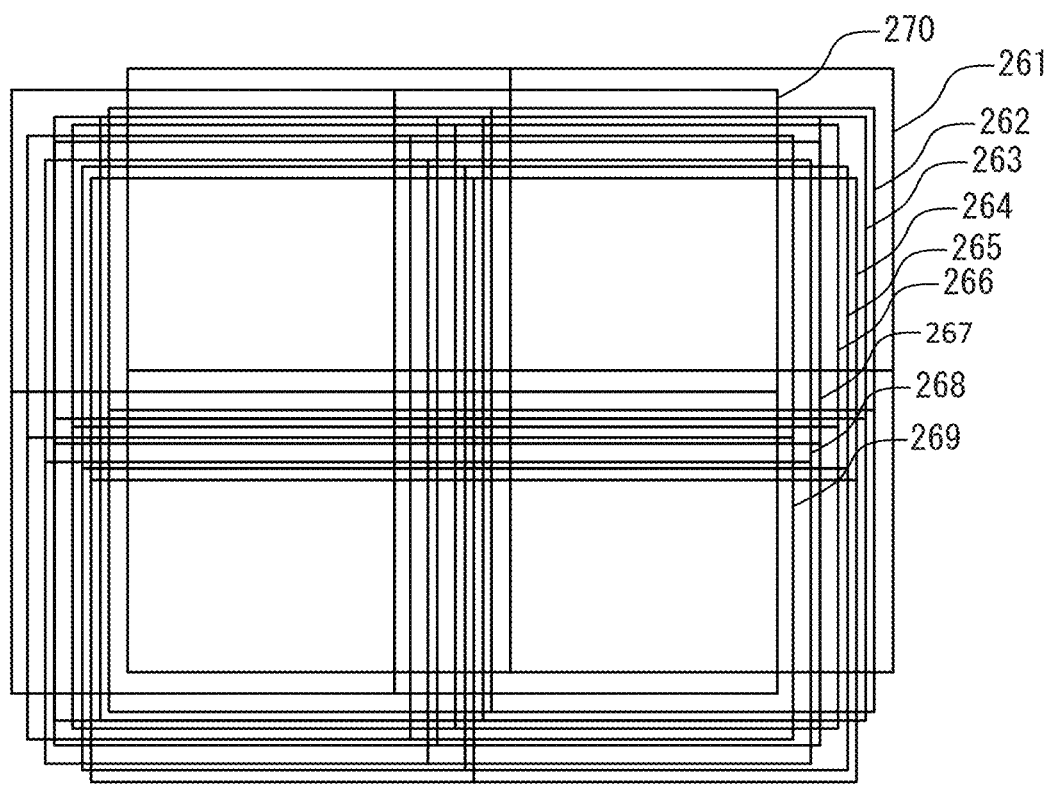
FIG. 13 is a diagram for explaining drawing processing according to a second modified example.

FIG. 13 is a diagram for explaining drawing processing according to a second modified example.

The second modified example is an example where the target region on which the drawing processing is performed is larger in area than each decorative pattern, as in the first modified example. In the example shown in FIG. 13, the area of the target region is four times as large as that of each decorative pattern. Although the area of the target region is 2×2 times each decorative pattern in the present embodiment, it may be N×n times where N and n are any numbers.

In the drawing processing according to the second modified example, each decorative pattern is formed repeatedly in the horizontal and vertical directions so that the borders between adjacent decorative patterns are displaced from each other.

In FIG. 13, the borders between the four positions for drawing the first decorative pattern 261 are displaced from those for drawing the second to tenth decorative patterns 262-270. Similarly, the borders between the four positions for drawing each of the second to tenth decorative patterns 262-270 are displaced from those for drawing the other decorative patterns. While repeating steps similar to S206 to S209, the laser processing apparatus can sequentially irradiate subregions of the target region with laser light so that the borders between adjacent decorative patterns are displaced from each other between the first to tenth decorative patterns. Since the drawing processing according to the second modified example is the same as the drawing processing according to the first modified example, duplicated explanation is omitted.

In the drawing processing according to the second modified example, a decoration is formed in which the borders between adjacent decorative patterns are hardly visible due to the other decorative patterns overlaid thereon.

Although ten decorative patterns, i.e., the first to tenth decorative patterns 221-230 are used to form a decoration in the above method for manufacturing a decorative component, six to twenty decorative patterns may be used instead. If the number of overlaid decorative patterns is five or less, the formed decoration may not feel like a hairline pattern. If the number of overlaid decorative patterns is twenty-one or more, the thickness of an oxide film formed by laser irradiation may be thick, causing the decorative patterns to discolor.

Although the lines constituting each of the first to tenth decorative patterns 221-230 are parallel to each other in the present embodiment, the directions of the lines may differ in the range of ±1° in each decorative pattern.

The preceding description has been presented only to illustrate and describe embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A method for manufacturing by laser light irradiation a component provided with a decoration having decorative patterns, the method comprising:
   irradiating a target region in a surface of the component with a first laser light so as to draw a first decorative pattern including a plurality of first straight lines;
   sequentially irradiating the target region with a second laser light so as to draw a second decorative pattern including a plurality of second straight lines;
   additionally irradiating the target region with laser light so as to lastly draw another decorative pattern including a plurality of third straight lines on the target region after the second decorative pattern is formed,
   wherein
   the decoration is a hairline finish which is composed of a large number of hair-like lines drawn in a single direction,
   the first decorative pattern includes lines extending from one end to the other end thereof and lines broken between both ends,
   the lines in the first decorative pattern are non-uniformly spaced in a direction perpendicular to an extending direction of the lines therein,
   the second decorative pattern includes lines which are broken between both ends thereof and displaced from each other in the direction of the lines,
   the lines in the second decorative pattern are uniformly spaced in the direction perpendicular to the extending direction of the lines therein,
   the lastly-drawn another decorative pattern is composed of a plurality of straight and parallel lines extending from an end to the other end thereof,
   the lastly-drawn another decorative pattern is overlaid on the first decorative pattern and the second decorative pattern,
   the lines of the lastly-drawn decorative pattern are spaced narrower than those of the first decorative pattern and the second decorative pattern which are previously formed before forming the last-drawn decorative pattern, and
   the first decorative pattern, the second decorative pattern and the lastly-drawn another decorative pattern are different from one another.

2. The method according to claim 1, further comprising:
   irradiating a subregion within the target region with a third laser light so as to draw a third decorative pattern including the plurality of first straight lines; and
   irradiating the subregion with a fourth laser light so as to draw a fourth decorative pattern including the plurality of second straight lines,
   wherein the lines included in the third decorative pattern connects with the lines included in the first decorative pattern, and the lines included in the fourth decorative pattern connects with the lines included in the second decorative pattern.

3. The method according to claim 1, further comprising:
   irradiating a subregion within the target region with a third laser light so as to draw a third decorative pattern including the plurality of first straight lines; and
   irradiating the subregion with a fourth laser light so as to draw a fourth decorative pattern including the plurality of second straight lines,
   wherein the border between the first decorative pattern and the third decorative pattern is displaced from the border between the second decorative pattern and the fourth decorative pattern.

4. The method according to claim 1, wherein directions of the plurality of lines differ in the range of ±1° between the first decorative pattern and the second decorative pattern.

* * * * *